United States Patent
Isogawa et al.

(10) Patent No.: US 12,003,762 B2
(45) Date of Patent: Jun. 4, 2024

(54) INFORMATION COMPLETION APPARATUS, METHOD AND PROGRAM

(71) Applicant: NIPPON TELEGRAPH AND TELEPHONE CORPORATION, Tokyo (JP)

(72) Inventors: Mariko Isogawa, Tokyo (JP); Dan Mikami, Tokyo (JP); Kosuke Takahashi, Tokyo (JP); Yoshinori Kusachi, Tokyo (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 257 days.

(21) Appl. No.: 17/613,464

(22) PCT Filed: May 28, 2019

(86) PCT No.: PCT/JP2019/021042
§ 371 (c)(1),
(2) Date: Nov. 22, 2021

(87) PCT Pub. No.: WO2020/240683
PCT Pub. Date: Dec. 3, 2020

(65) Prior Publication Data
US 2022/0232249 A1    Jul. 21, 2022

(51) Int. Cl.
*H04N 19/00* (2014.01)
*G06V 20/40* (2022.01)
*H04N 19/577* (2014.01)

(52) U.S. Cl.
CPC ........... *H04N 19/577* (2014.11); *G06V 20/40* (2022.01); *G06V 2201/07* (2022.01)

(58) Field of Classification Search
CPC ... H04N 19/577; G06V 20/40; G06V 2201/07
See application file for complete search history.

(56) References Cited

U.S. PATENT DOCUMENTS

2017/0300759 A1* 10/2017 Beard .................... H04N 7/183

FOREIGN PATENT DOCUMENTS

JP          2006-040199 A       2/2006

OTHER PUBLICATIONS

Masaki et al. "JP 2006-040199A Translation". (Year: 2006).*
(Continued)

*Primary Examiner* — Zhihan Zhou

(57) ABSTRACT

A technique for interpolating positional information of a target in an image of a frame in which positional information of the target has not been acquired. An information interpolation device includes: a target information acquisition unit 4 acquiring target information that is information related to a target in an image of each frame composing an input video; an indicator determination unit 5 determining, based on the target information, an indicator indicating validity as a starting frame for each frame, the starting frame starting predetermined image processing on a target; a starting frame determination unit 6 determining a starting frame based on the determined indicator; and a target information interpolation unit 7 interpolating, when a frame in which positional information of a target is not included in target information exists among frames within a predetermined number from the determined starting frame, positional information of the target of the frame that does not include the positional information of the target by using positional information of the target included in target information of a frame other than the frame that does not include the positional information of the target.

5 Claims, 6 Drawing Sheets

(56) References Cited

OTHER PUBLICATIONS

Ijiri et al. (2017) "Automatic spin measurements for pitched Baseballs via consumer-grade high-speed cameras," Image and Video Processing, vol. 11, Issue 7, pp. 1197-1204.

* cited by examiner

INFORMATION COMPLETION APPARATUS, METHOD AND PROGRAM

CROSS-REFERENCE TO RELATED APPLICATIONS

This application is a U.S. National Stage Application filed under 35 U.S.C. § 371 claiming priority to International Patent Application No. PCT/JP2019/021042, filed on 28 May 2019, the disclosure of which is hereby incorporated herein by reference in its entirety.

TECHNICAL FIELD

The invention relates to an image processing technique.

BACKGROUND ART

A study has been conducted to estimate a spin condition of a pitched ball taking, as an input, a video including pitching motions of a pitcher of baseball or softball as well as a pitched ball (hereinafter, referred to as a pitching video) (for example, refer to Non-Patent Literature 1).

With the technique of estimating the spin condition based on such video processing, pitching information can be acquired from the pitching video without using a ball tracking system of the Doppler radar type or other systems; thereby a configuration relatively inexpensive with less restrictions on installation of equipment is feasible.

In such a spin condition estimation technique based on video processing, it is required, as preprocessing, to identify a ball and acquire positional information of the ball in an image of each frame composing a video.

However, in the case where there exists any frame in which positional information of a ball has not been acquired among the frames composing a video, no technique to interpolate the positional information of the ball in an image of the frame in which the positional information of the ball has not been acquired is known.

CITATION LIST

Non-Patent Literature

Non-Patent Literature 1: Takashi Ijiri et al., "Automatic spin measurements for pitched Baseballs via consumer-grade high-speed cameras," Image and Video Processing, vol. 11, Issue 7, pp. 1197-1204, 2017.

SUMMARY OF THE INVENTION

Technical Problem

An object of the invention is to provide an information interpolation device, a method and a program thereof interpolating, in the case where there exists any frame in which positional information of a target (such as a ball) has not been acquired among frames composing a video, the positional information of the target in an image of the frame in which the positional information of the target has not been acquired.

Means for Solving the Problem

An information interpolation device according to an embodiment of the invention includes: a target information acquisition unit acquiring target information that is information related to a target in an image of each frame composing an input video; an indicator determination unit determining, based on the target information, an indicator indicating validity as a starting frame for each frame, the starting frame starting predetermined image processing on a target; a starting frame determination unit determining a starting frame based on the determined indicator; and a target information interpolation unit interpolating, when a frame in which positional information of a target is not included in target information exists among frames within a predetermined number from the determined starting frame, positional information of the target of the frame that does not include the positional information of the target by using positional information of the target included in target information of a frame other than the frame that does not include the positional information of the target.

Effects of the Invention

Positional information of a target in an image of a frame in which the positional information of the target has not been acquired can be interpolated.

DESCRIPTION OF EMBODIMENTS

Figure 1:
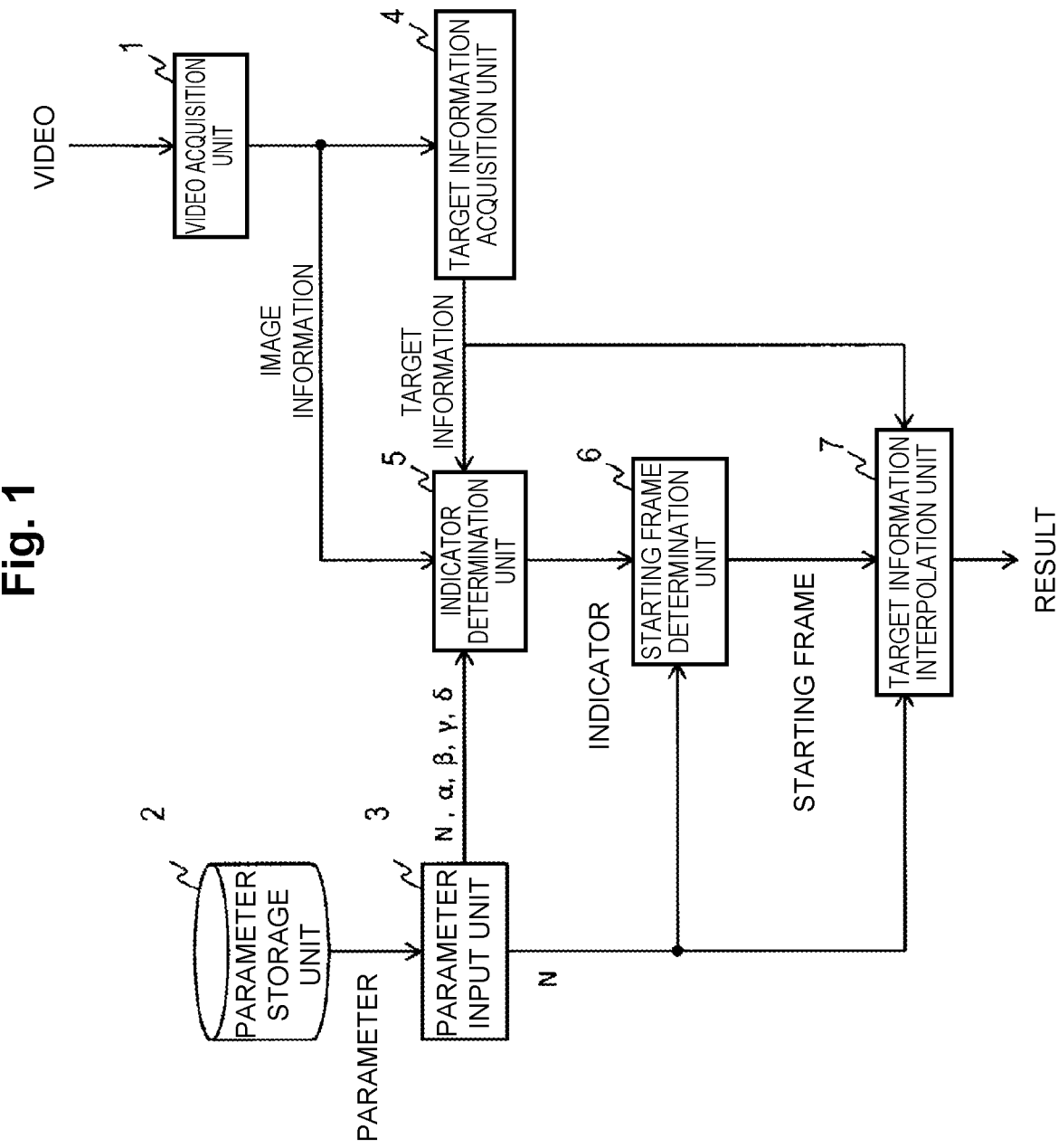
FIG. 1 is a diagram showing an example of a functional configuration of an information interpolation device.

Hereinafter, an embodiment of the present invention will be described in detail. In the drawings, components having the same function are assigned with the same number, and redundant description will be omitted.

[Information Interpolation Device and Method]

As shown in FIG. 1, the information interpolation device includes, for example, a video acquisition unit 1, a parameter storage unit 2, a parameter input unit 3, a target information acquisition unit 4, an indicator determination unit 5, a starting frame determination unit 6, and a target information interpolation unit 7.

Figure 2:
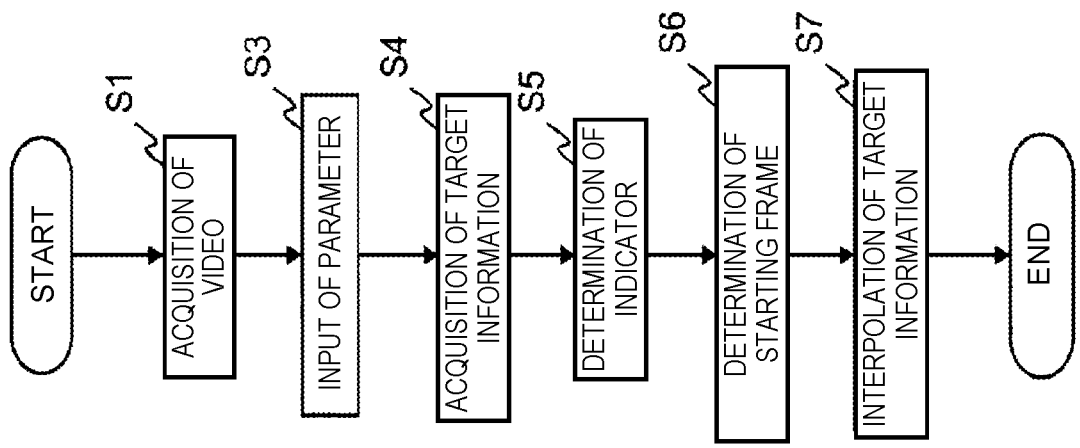
FIG. 2 is a diagram showing an example of processing procedures of an information interpolation method.

The respective components of the information interpolation device execute the steps S1 to S7 described as follows and shown in FIG. 2, for example, to thereby achieve the image processing method.

Hereinafter, each component of the information interpolation device will be described.

<Video Acquisition Unit 1>

A video showing a target is input to the video acquisition unit 1. For example, in the case where the target is a ball, the video to be input is a pitching video. Of course, the target is not limited to a baseball. The target may be, for example, other spherical objects having a pattern, such as a seam.

Based on the input video, the video acquisition unit 1 outputs a set of image information $V(t,x,y)$ (step S1). Examples of the image information include a pixel value. In the case of the pixel value of 256-level gray scale, a scalar value corresponds to the image information. In the case of the RGB colors, three-dimensional vectors or the like correspond to the image information. However, the examples are not limited thereto. The index t represents the frame number, and the indexes x and y represent spatial positions in the x and y directions in the image, respectively. The index t=1, . . . , T. Here, T represents a frame length that is a predetermined positive integer. The index x=1, 2, . . . , X, and the index y=1, 2, . . . , Y. Here, X and Y represent the number of pixels in the horizontal direction and the number of pixels in the vertical direction, respectively, of the frame image.

The image information V(t,x,y) is output to the target information acquisition unit 4 and the indicator determination unit 5.

<Parameter Storage Unit 2>

The parameter storage unit 2 stores parameters in the form of the text data or the like, which have been determined by a user in advance, to be used in the information interpolation device.

Examples of the parameters used in the information interpolation device include: the number N of frames of the target to be extracted; and $\alpha$, $\beta$, $\gamma$, and $\delta$ used in the indicator determination unit 5.

N is a predetermined positive integer. Each of $\alpha$, $\beta$, $\gamma$, and $\delta$ is a predetermined positive number.

<Parameter Input Unit 3>

The parameter input unit 3 reads the parameters stored in the parameter storage unit 2 and outputs each of the read parameters to the component that will use the parameter (step S3).

The parameters $\alpha$, $\beta$, $\gamma$, and $\delta$ are output to the indicator determination unit 5. The parameter N is output to the indicator determination unit 5, the starting frame determination unit 6 and the target information interpolation unit 7.

<Target Information Acquisition Unit 4>

The image information V(t,x,y) is input to the target information acquisition unit 4. The target information acquisition unit 4 also acquires target information that is information related to a target in an image of each frame composing the input video (step S4).

The acquired target information is output to the indicator determination unit 5 and the target information interpolation unit 7.

For example, the target information includes (1) the flag value ball_flag indicating whether or not the target exists in the frame. The target information may further include at least one of (2) the center position of the target ball_pos in the frame, (3) in the case where the target is in a circular shape, such as a ball, the radius of the target ball_r, and (4) the pixel region ball_region determined to be the target.

For example, if the flag value ball_flag indicating whether or not the target exists in the frame is 1, that is, ball_flag=1 indicates that the target exists, whereas the flag value is 0, that is, ball_flag=0 indicates that the target does not exist.

It is assumed that the positional information of the target is included in the target information. In the above example, the positional information of the target corresponds to (2) the center position of the target ball_pos in the frame and (3) the radius of the target ball_r.

Other information to be included in the target information may be appropriately determined in accordance with the information used in the indicator determination unit 5 or the information desired to be interpolated and output by the information interpolation device and method.

As the technique for acquiring target information, a technique based on template matching as described in Non-Patent Literature 1 or Hough transform, or a learning-based estimation technique as in Reference 1 may be used. Needless to say, the technique for acquiring target information is not limited to these techniques, and the target information may be acquired by other techniques.

[Reference 1] Kaiming He et al., "Mask R-CNN," IEEE International Conference on Computer Vision (ICCV), pp. 2980-2988, 2017.

<Indicator Determination Unit 5>

The target information acquired in the target information acquisition unit 4 is input to the indicator determination unit 5. The image information V(t,x,y) acquired in the video acquisition unit 1 is also input to the indicator determination unit 5. Further, N, $\alpha$, $\beta$, $\gamma$, and $\delta$ are input from the parameter input unit 3 to the indicator determination unit 5, as necessary.

Based on the input target information, the indicator determination unit 5 determines the indicator "score" indicating validity as a starting frame that starts predetermined image processing on a target for each frame (step S5).

The determined indicator "score" is output to the starting frame determination unit 6.

Hereinafter, description will be given of Techniques 1 and 2 that are examples of the technique for determining an indicator indicating validity as a starting frame. Needless to say, the technique for determining the indicator is not limited to these techniques, and the indicator may be determined by other techniques.

Technique 1 is an example of a technique for obtaining the indicator "score" indicating that the validity as the starting frame is increased as the value is reduced, whereas Technique 2 is an example of a technique for obtaining the indicator "score" indicating that the validity as the starting frame is increased as the value is increased.

(Technique 1)

Technique 1 of the indicator determination unit 5 is assumed to be combined with Technique 1 of the starting frame determination unit 6, which will be described later, for use.

Technique 1 determines the indicator based on two consecutive frames. In other words, in the case where the frame for which the indicator is to be determined is assumed to be frame_ID, the indicator of the frame of frame_ID is determined based on two frames, frame_ID and frame_ID−1.

For example, it is assumed that the flag value, which is acquired by the target information acquisition unit 4, indicating whether or not the target exists in the frame being 1, that is, ball_flag=1 indicates that the target exists, whereas the flag value being 0, that is, ball_flag=0 indicates that the target does not exist.

It is also assumed that the flag value corresponding to frame_ID is ball_flag=1, and the flag value corresponding to frameID−1 is ball_flag=0.

In this case, since the target does not exist in the frame of frameID−1 and the target exists in the frame of frameID, frameID is determined to have high possibility of the frame immediately after the appearance of the target (in the case where the target is a pitching scene of a ball, a release frame of the ball).

Consequently, in this case, the indicator determination unit 5 determines the indicator "score" corresponding to the frame of frame_ID to be relatively small value in the range from 0 or more and 1 or less, such as 0.5 or less (for example, 0). In the cases other than the above, the indicator determination unit 5 determines the indicator "score" corresponding to the frame of frame_ID to be relatively large value in the range from 0 or more and 2 or less (for example, 1). To put it another way, in the case where the flag value corresponding to frame_ID is ball_flag=1, and the flag value corresponding to frameID−1 is ball_flag=0, the indicator determination unit 5 determines the indicator "score" corresponding to the frame of frame_ID to be smaller than the "score" in other cases.

The indicator determination unit 5 may determine the indicator to be score=0 in the case where "(the flag value corresponding to frame_ID is ball_flag=1) AND (the flag value corresponding to frameID−1 is ball_flag=0)" is established. The indicator determination unit 5 may determine the indicator to be score=1 in the case where "(the flag value corresponding to frame_ID is ball_flag=1) AND (the flag value corresponding to frameID−1 is ball_flag=0)" is not established, and the flag value corresponding to frame_ID is ball_flag=0. The indicator determination unit 5 may determine the indicator to be score=2 in the case where "(the flag value corresponding to frame_ID is ball_flag=1) AND (the flag value corresponding to frameID−1 is ball_flag=0)" is not established, and the flag value corresponding to frame_ID is ball_flag=1.

Of course, the values to be set at the indicator "score" are not limited to the above values, and other values may be set.

As described above, in the case where the frame next to the frame in which the target information includes information indicating that the target does not exist is the frame in which the target information includes information indicating that the target exists, as the indicator of the frame in which the target information includes information indicating that the target exists, the indicator determination unit 5 may determine the indicator indicating high validity as the starting frame that is the frame to start predetermined image processing on the target.

(Technique 2)

Technique 2 of the indicator determination unit 5 is assumed to be combined with Technique 2 of the starting frame determination unit 6, which will be described later, for use.

Technique 2 determines the indicator based on N+1 consecutive frames. In other words, in the case where the frame for which the indicator is to be determined is assumed to be frame_ID, the indicator of the frame_ID is determined based on frame_ID and N consecutive frames subsequent thereto. To put it another way, Technique 2 determines the indicator of frame_ID based on image information of N+1 consecutive frames from frameID to frameID+N.

The indicator determination unit 5 calculates L(t) defined by, for example, the following expression to obtain the indicator "score" of the frame of frame_ID. S(t) is an indicator "score" indicating how stable a target might be extracted in each frame, and L(t) represents a value of integral thereof.

$$S(t)=\alpha*\text{ball\_flag}+\beta*\text{ball\_occlusion}+\gamma*\text{ball\_diff}+\delta*\text{ball\_seam} \quad L(t)=\Sigma_{t'=t}^{t+N} S(t')$$

$\alpha$, $\beta$, $\gamma$, and $\delta$ are scalar values for designating weights of terms. $\alpha$, $\beta$, $\gamma$, and $\delta$ are stored in the parameter storage unit 2 and input by the parameter input unit 3.

ball_flag is a flag value indicating whether or not a target exists in the frame acquired by the target information acquisition unit 4, and is acquired by the target information acquisition unit 4.

ball_occlusion is an evaluation value indicating size of an overlapping region between a target and an object other than the target, such as a human region. The effect of barely selecting a frame having high possibility of reduction in detection accuracy of the target can be expected by taking ball_occlusion into account.

For example, the shortest distance between a foreground region obtained by a background difference and the center position ball_pos of the target in the frame or the shortest distance with the position of the center of gravity in the target region acquired by an object detection technique as in Non-Patent Literature 1 can be assumed to be ball_occlusion. The position of the center of gravity in the target region is ball_pos acquired by, for example, the target information acquisition unit 4.

ball_diff is an evaluation value indicating how the target is close to a predetermined shape. In the case where the target is a ball, ball_diff is an evaluation value indicating, for example, a difference between a mask image I_direct showing a pixel region determined to be a target obtained from ball_region acquired by the target information acquisition unit 4 and a mask image I_fit showing a pixel region estimated to be a ball shown by a region of a target having been subjected to circular fitting based on ball_pos and ball_r acquired by the target information acquisition unit 4.

The mask images I_direct and I_fit are binary images in which, for example, only the pixels determined or estimated to be a target each have the value of 1, and the other pixels each have the value of 0. ball_diff can be calculated by, for example, taking an L2 norm of I_direct and I_fit as in the following expression.

$$\text{ball\_diff}=\|I\_direct-I\_fit\|$$

ball_seam is an evaluation value indicating magnitude of variation of a pattern (in the case where the target is a ball, seams of the ball) in a target suitable to spin condition quantity estimation for a target, which is performed, for example, after the technique suggested in the present invention. In other words, ball_seam is an evaluation value expecting the effect to easily extract a frame having an outer appearance with high possibility of accurately performing spin condition estimation of a target.

Figure 3:
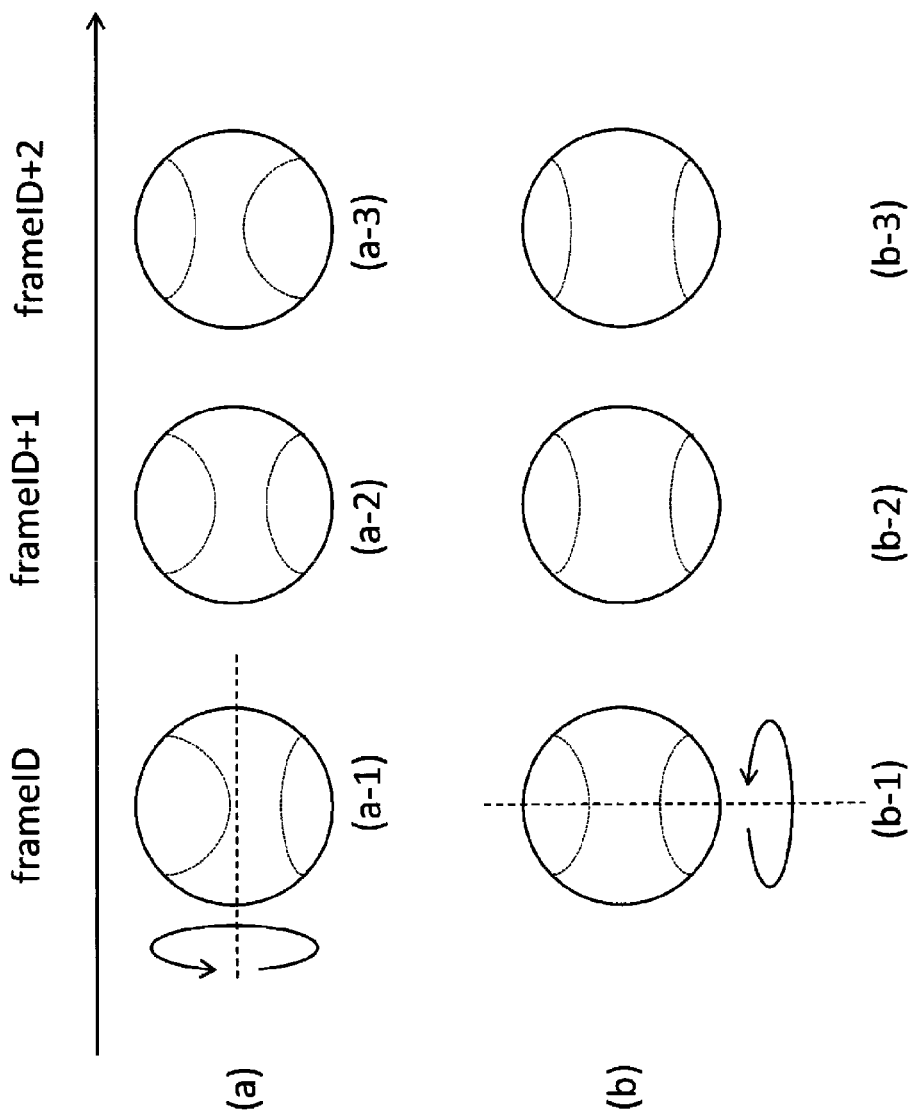
FIG. 3 is a diagram showing an example of variation in outer appearance in the case where a target is a ball.

For example, in the case where the target is a ball with an attitude of (a-1) in frameID and spins around a spin axis in the horizontal direction as in FIG. 3A, the outer appearances, such as (a-2) and (a-3) appear in frameID+1 and frameID+2, respectively. In this case, the frames frameID, frameID+1 and frameID+2 are considered to be the consecutive frames in which variations in spin conditions of a target are relatively easy to be observed.

In the case where the target has an attitude of (b-1) in frameID and spins around a spin axis in the vertical direction as in FIG. 3B, the outer appearances, such as (b-2) and (b-3) appear in frameID+1 and frameID+2, respectively. In this case, the frames of frameID, frameID+1 and frameID+2 are considered to be the consecutive frames in which variations in spin conditions of a target are relatively hard to be observed. In this case, there is a possibility that the estimation of the spin conditions cannot be performed with high accuracy in the frames frameID, frameID+1 and frameID+2.

ball_seam is defined so that, for example, the value of ball_seam in the case of FIG. 3A is smaller than the value of ball_seam in the case of FIG. 3B.

Though the calculation method of ball_seam is not limited, the indicator determination unit 5 can calculate ball_seam by, for example, the following method.

((Calculation Example 1 of Ball_Seam))

Template images showing variations in outer appearances of a target performing desired movements are prepared. For example, the template images are assumed to include images showing variations in the outer appearances of the target in the cases of preforming spin movements in the plural respective directions including two spin movements, namely, vertical spin and side spin, of the target. For example, in the case where the target is a ball, a template image showing variations in an outer appearance of the ball in the case where a pitcher threw a fastball, a template image showing variations in an outer appearance of the ball in the case where a pitcher threw a curve ball, a template image showing variations in an outer appearance of the ball in the case where a pitcher threw a slider, and other template images are prepared in advance.

Suppose that t' is a predetermined positive integer, tem=1, ..., t', and a single template image "tem" includes images of k frames. The image of the frame f(f=1, ..., k) included in the template image "tem" is represented as (tem,f). k is a predetermined positive integer, for example, k=3.

Assuming that a difference between ball_region of the frame of t acquired by the target information acquisition unit 4 and (tem,f) is $d_1$ (t,tem,f), the indicator determination unit 5 calculates $\Sigma_{t=frameID}^{frameID+f-1} d_1$ (t,tem,t-frameID+1) for each template image tem=1, ..., t'. The indicator determination unit 5 defines an output value in the case where the largest value of $\Sigma_{t=frameID}^{frameID+f-1} d_1$ (t, tem, t-frameID+1) among the values of $\Sigma_{t=frameID}^{frameID+f-1} d_1$ (t, tem, t-frameID+1) corresponding to the respective calculated template images tem=1, ..., t' is input to a predetermined non-increasing function as ball_seam. Examples of the predetermined non-increasing function include f(x)=1/x.

Thus, the indicator determination unit 5 calculates the sum total of inter-frame differences between the respective template images and ball_region acquired by the target information acquisition unit 4, and defines the output value in the case of inputting the largest sum total to the predetermined non-increasing function as ball seam.

In this manner, ball_seam, which is an evaluation value indicating magnitude of variation of a pattern in the target, may be an indicator indicating proximity between the image of the target in each frame and the predetermined template image.

((Calculation Example 2 of Ball_Seam))

The indicator determination unit 5 may calculate the inter-frame differences of regions of the target indicated by ball_region with respect to n consecutive frames including frameID, such as frameID, frameID+1, and frameID+2, and may define the sum total thereof as ball_seam. n is a predetermined positive integer.

For example, assuming that i=0, ..., n-1, and difference between ball_region of the frame of frameID+i and ball_region of the frame of frameID+i+1 is $d_2(i)$, the indicator determination unit 5 calculates $\Sigma_{i=0}^{n-1} d_2(i)$ and defines the calculation result thereof as ball_seam.

In this manner, ball_seam, which is an evaluation value indicating a magnitude of variation of a pattern in the target, may be the sum of magnitudes of differences among the target images in the consecutive frames.

Thus, the indicator determination unit 5 may calculate the indicator based on at least one of (i) the information ball_flag on whether or not the target exists, (ii) the evaluation value ball_occlusion indicating the size of the overlapping region of the target and an object other than the target, (iii) the evaluation value ball_diff representing how the target is close to the predetermined shape, and (iv) the evaluation value ball_seam representing a magnitude of variation of a pattern in the target, that are included in the target information or calculated from the target information.

<Starting Frame Determination Unit 6>

The indicator "score" determined by the indicator determination unit 5 is input to the starting frame determination unit 6. Further, the number of frames N is input to the indicator determination unit 5 from the parameter input unit 3.

The starting frame determination unit 6 determines the starting frame frame_start based on the input indicator "score" (step S6).

The information on the determined starting frame is output to the target information interpolation unit 7.

Hereinafter, description will be given of Techniques 1 and 2 that are examples of the technique for determining the starting frame. As in the Techniques 1 and 2, a search is made for a part, not all, of frames, and thereby determination of the starting frame frame_start can be performed at high speed.

Needless to say, the technique for determining the starting frame is not limited to these techniques, and the starting frame may be determined by other techniques.

(Technique 1)

Technique 1 of the starting frame determination unit 6 is assumed to be combined with Technique 1 of the indicator determination unit 5 for use.

Technique 1 is based on the so-called binary search. Technique 1 is configured with processing from step 0 to step 2.

Step 0: The starting frame determination unit 6 sets, as the initial values, frame_L=1 and frame_H=T.

Step 1: The starting frame determination unit 6 defines that frame_M=(frame_H−frame_L)/2. In the case where (frame_H−frame_L)/2 is not an integer, the starting frame determination unit 6 may define the largest integer not more than (frame_H−frame_L)/2 or the largest integer not more than (frame_H−frame_L)/2 plus one as frame_M.

Step 2: If the indicator "score" corresponding to frame_M, which has been determined by the indicator determination unit 5, is 0, the starting frame determination unit 6 determines the frame_M as the starting frame frame_start.

If the indicator "score" corresponding to frame_M is one, the starting frame determination unit 6 defines that frame_L=frame_M and returns to Step 1.

If the indicator "score" corresponding to frame_M is two, the starting frame determination unit 6 defines frame_H=frame_M and returns to Step 1.

In the case where frame_L and frame_H have the same value, the starting frame determination unit 6 determines frame_M to be the starting frame frame_start.

Here, validity of the indicator score=0 as the starting frame frame_start will be shown. The indicator score=1 is not valid as the starting frame frame_start, and indicates that the target does not exist in the frame in frame_M. The indicator score=2 is not valid as the starting frame frame_start, and indicates that the target exists in the frame in frame_M.

If similar control is available, the starting frame frame_start may be determined by using a different indicator "score," such as 3, 4, or 5.

Note that, in each step in the starting frame determination unit 6, in the case where the value of frame_M is not an integer, the nearest integer is used.

(Technique 2)

Technique 2 performs processing by use of the frames having predetermined intervals. In other words, Technique 2 performs processing at intervals of N frames. N is a parameter input from the parameter input unit 3.

Technique 2 is configured with processing from step 0 to step 2.

Step 0: To obtain an upper limit of the frame number in which the target exists, the starting frame determination unit 6 makes a search for the frame in which the target exists from the frame length T of V(t,x,y) at the intervals of N frames. Specifically, if the indicator of the T−N*(s−1)th frame is score≥Th, the starting frame determination unit 6 defines the frame as frame_Max. Th represents a threshold value determined in advance, and is a predetermined positive integer.

Suppose that an integer not less than 1 and less than T/N is s', s is an integer indicating the number of trials, which is not less than 1 and less than s'. The starting frame determination unit 6 sequentially performs the processing from s=1 to s' until the frame with the indicator of the T−N*(s−1)th frame being score≥Th is found.

Step 1: To obtain a lower limit of the frame number in which the target exists, the starting frame determination unit 6 makes a search for the frame in which the target exists at the intervals of N frames. Specifically, if the indicator of the N*(s−1)th frame is score≥Th, the starting frame determination unit 6 defines the frame as frame_Min.

Suppose that an integer not less than 1 and less than T/N is s', s is an integer indicating the number of trials, which is not less than 1 and less than s'. The starting frame determination unit 6 sequentially performs the processing from s=1 to s' until the frame with the indicator of the T−N*(s−1)th frame being score≥Th is found.

Step 2: The starting frame determination unit 6 defines that frame_start=(frame_Max−frame_Min)/2. In the case where (frame_Max−frame_Min)/2 is not an integer, the starting frame determination unit 6 may define the largest integer not more than (frame_Max−frame_Min)/2 or the largest integer not more than (frame_Max−frame_Min)/2 plus one as frame_start.

Note that, in the case where the magnitude relationship of frame_Max and frame_Min is inverted, or either one does not have any value, the starting frame determination unit 6 may define the frame_start as a scalar value "error" indicating an error, such as −1.

<Target Information Interpolation Unit 7>

The information of starting frame determined in the starting frame determination unit 6 is input to the target information interpolation unit 7. Moreover, the number of frames N is input to the target information interpolation unit 7 from the parameter input unit 3. Further, the target information acquired in the target information acquisition unit 4 is input to the target information interpolation unit 7.

In the case where a frame in which positional information of a target is not included in target information exists among the frames within the predetermined number from the starting frame determined in the starting frame determination unit 6, the target information interpolation unit 7 interpolates the positional information of the target of the frame that does not include the positional information of the target by use of positional information of the target included in target information of a frame other than the frame in which positional information of the target is not included (step S7).

First, the target information interpolation unit 7 determines whether a frame in which positional information of a target is not included in target information exists among the frames from frame_start to frame_start+N.

For example, the flag value ball_flag indicating whether or not the target exists in the frame of 1, namely, ball_flag=1 indicates that the target exists, whereas the flag value of 0, that is, ball_flag=0 indicates that the target does not exist. In this case, if there is a frame with the flag value ball_flag=0, the target does not exists in the frame, and positional information of the target is not included in target information of the frame. For this reason, for example, the target information interpolation unit 7 can determine whether or not the frame in which the positional information of the target is not included in the target information exists by determining whether or not the frame with the flag value ball_flag=0 exists.

If it is determined that there is no frame in which the positional information of the target is not included in the target information, the target information interpolation unit 7 outputs target information of each of the frames from frame_start to frame_start+N.

In the case where it is determined that a frame in which the positional information of the target is not included exists, the target information interpolation unit 7 interpolates the positional information of the target of the frame that does not include the positional information of the target by use of positional information of the target included in target information of a frame other than the frame in which positional information of the target is not included.

Note that, only in the case where at least two frames in which the positional information of the target is included in the target information exist among the N+1 frames from frame_start to frame_start+N, the target information interpolation unit 7 may perform interpolation of target information to be described later.

In addition, the target information interpolation unit 7 may terminate the processing in the case where input frame_start is a scalar value "error" indicating an error, such as −1.

Interpolation of the target information can be performed by, for example, the following technique.

The target information interpolation unit 7 defines, of t(frame_start≤t≤frame_start+N), the frame number to be interpolated, in which ball_flag indicates that the target does not exist, as t'. The target information interpolation unit 7 defines, from among the frames chronologically before the t'th frame, the frame nearest to t', in which ball_flag indicates that the target exists, as t_min. The target information interpolation unit 7 defines, from among the frames chronologically after the t'th frame, the frame nearest to t', in which ball_flag indicates that the target exists, as t_max.

In the case where the positional information of the target is (2) the center position of the target ball_pos in the frame and (3) the radius of the target ball_r, the target information interpolation unit 7 obtains ball_pos and ball_r of the t'th frame by, for example, linear interpolation defined by the following expressions.

$$\text{ball\_pos}(t) = (\text{ball\_pos}(t\_\text{max}) - \text{ball\_pos}(t\_\text{min})) * (t - t\_\text{min})/(t\_\text{max} - t\_\text{min})$$

$$\text{ball\_r}(t) = (\text{ball\_r}(t\_\text{max}) - \text{ball\_r}(t\_\text{min})) * (t - t\_\text{min})/(t\_\text{max} - t\_\text{min})$$

As described above, according to the above information interpolation device and method, in the case where there exists any frame in which positional information of a target (such as a ball) has not been acquired among frames composing a video, it is possible to interpolate the positional information of the target in an image of the frame in which the positional information of the target has not been acquired.

Figure 4:
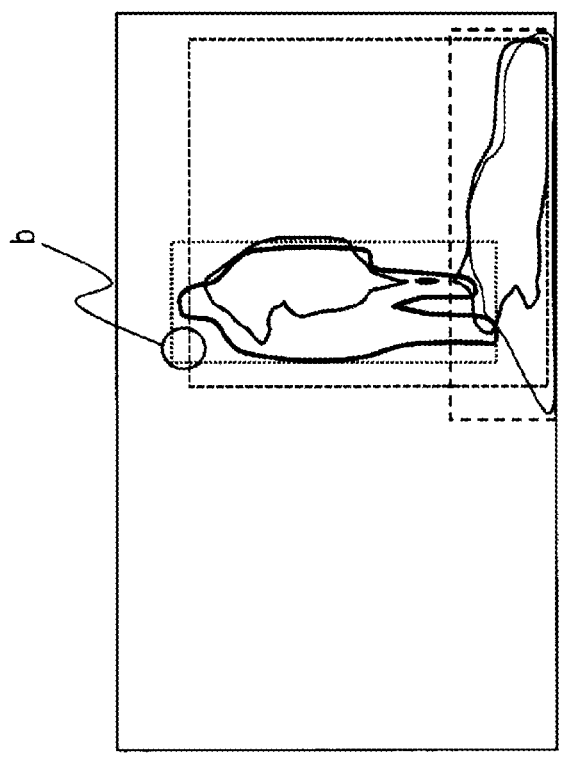
FIG. 4 is a diagram for illustrating an example of interpolation of positional information of the target.
Figure 5:
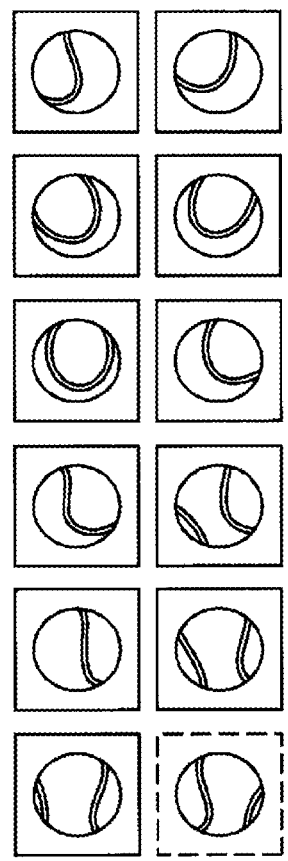
FIG. 5 is a diagram for illustrating an example of interpolation of positional information of the target.

As the example of FIG. 4, in the case where target information is acquired with respect to image information V(t,x,y) of a frame t, the target b is not recognized, and accordingly, positional information of the target cannot be acquired in some cases. In such a case, by the above-described information interpolation device and method, the positional information of the target in the frame t, which has not been acquired, can be interpolated. This makes it possible to acquire positional information of the target in N consecutive frames as shown in FIG. 5. In FIG. 5, the positional information of the ball that is the target in the frame enclosed by a broken line at the bottom left of FIG. 5, where N=12, is interpolated.

MODIFIED EXAMPLE

So far, the embodiment of the present invention has been described, but the specific configurations of the present invention are not limited to the embodiment. It is apparent that appropriate design changes not departing from the gist of the present invention are within the scope of the present invention.

For example, data exchanges between the components of the information interpolation device may be directly performed, or may be performed via a not-shown memory unit.

Moreover, various kinds of processing described in the embodiment may be not only chronologically executed in accordance with the order of description, but may also be executed in parallel or individually according to the processing capacity of the device that executes the processing, or as needed.

For example, processing of the target information acquisition unit 4, the indicator determination unit 5, and the starting frame determination unit 6 may be performed in parallel.

For example, it may be possible that the starting frame determination unit 6 makes a request for determining the indicator "score" of frame_M to the indicator determination unit 5, the indicator determination unit 5 determines the indicator "score" of frame_M after receiving the request, and then outputs the indicator "score" of frame_M that has been determined to the starting frame determination unit 6.

Moreover, it may be possible that the starting frame determination unit 6 makes a request for determining the indicator "score" of the T−N*(s−1)th frame to the indicator determination unit 5, the indicator determination unit 5 determines the indicator "score" of the T−N*(s−1)th frame after receiving the request, and then outputs the indicator "score" of the T−N*(s−1)th frame that has been determined to the starting frame determination unit 6.

Moreover, it may be possible that the starting frame determination unit 6 makes a request for determining the indicator "score" of the N*(s−1)+1th frame to the indicator determination unit 5, the indicator determination unit 5 determines the indicator "score" of the N*(s−1)+1th frame after receiving the request, and then outputs the indicator "score" of the N*(s−1)+1th frame that has been determined to the starting frame determination unit 6.

As described above, the indicator determination unit 5 determines the indicator only for the frame necessary for the processing of the starting frame determination unit 6; thereby the overall throughput can be decreased.

Moreover, it may be possible that the indicator determination unit 5 makes a request for determining target information of a frame necessary to perform processing to the target information acquisition unit 4, the target information acquisition unit 4 acquires the target information of the frame after receiving the request, and then outputs the acquired target information to the indicator determination unit 5.

Moreover, it may also be possible that the target information interpolation unit 7 makes a request for determining target information of a frame necessary to perform processing to the target information acquisition unit 4, the target information acquisition unit 4 acquires the target information of the frame after receiving the request, and then outputs the acquired target information to the target information interpolation unit 7.

As described above, the target information acquisition unit 4 acquires the target information only for the frame necessary for the processing of the indicator determination unit 5 or the target information interpolation unit 7; thereby the overall throughput can be decreased.

[Program and Recording Medium]

Figure 6:
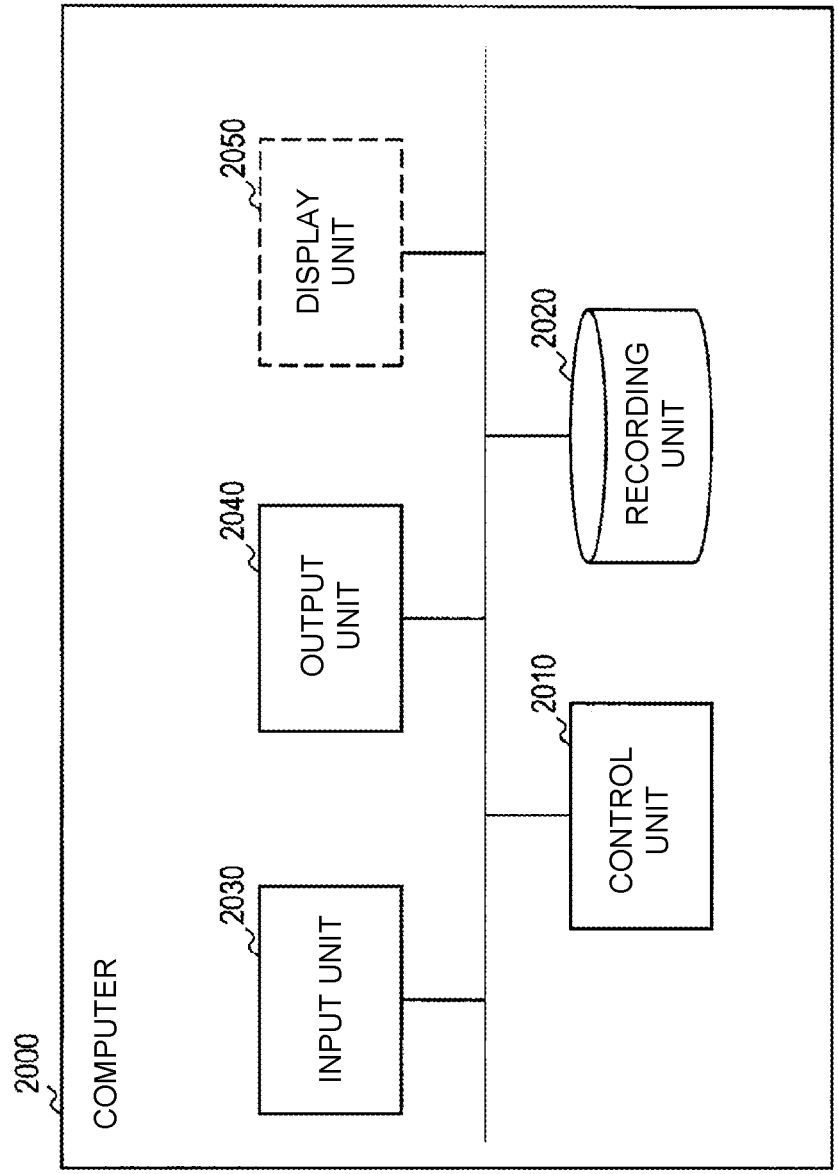
FIG. 6 is a diagram showing a functional configuration example of a computer.

The above-described various processing can be executed by causing a recording unit 2020 of a computer shown in FIG. 6 to read a program to implement each step of the above method, and causing a control unit 2010, an input unit 2030, an output unit 2040, or other units to operate.

The program describing the processing details can be recorded on a computer-readable recording medium. Examples of the computer-readable recording medium include a magnetic recording device, an optical disk, a magneto-optical recording medium, a semiconductor memory, or any medium.

Distribution of the program is achieved by, for example, sales, transfer, rental, and other deals of a portable recording medium, such as a DVD or a CD-ROM, on which the program is recorded. Further, the program may be distributed by storing thereof in a storage device of a server computer and transferring the program from the server computer to other computers via a network.

A computer executing such a program, for example, stores the program recorded on a portable recording medium or the program transferred from a server computer once in a storage device thereof. In executing the processing, the computer reads the program stored in the storage device thereof and executes processing in accordance with the program that has been read. As another execution form of the program, it may be possible that the computer directly reads the program from a portable recording medium and executes processing in accordance with the program, and further, each time the program is transferred to the computer from the server computer, the computer sequentially executes processing in accordance with the received program. Moreover, the above processing may be executed by a so-called ASP (application service provider)-type service by which the processing functions are implemented only in accordance with execution instructions and result acquisition without transferring the program to the computer from the server computer. Note that the program in the embodiment includes information provided for processing by electronic calculator, which is equivalent to a program (such as data that is not a direct instruction to the computer, but has a property for specifying the processing by the computer).

Moreover, in the embodiment, the device is configured by causing a computer to execute a predetermined program; however, at least part of these processing details may be realized as a hardware aspect.

REFERENCE SIGNS LIST

1 Video acquisition unit
2 Parameter storage unit
3 Parameter input unit
4 Target information acquisition unit
5 Indicator determination unit 6 Starting frame determination unit
7 Target information interpolation unit

The invention claimed is:

1. An information interpolation device comprising:
processing circuitry configured to:
acquire target information that is information related to a target in an image of each frame composing an input video;
performing either one of:
when a frame next to a frame in which target information includes information indicating that a target does not exist is a frame in which target information includes information indicating that the target exists, determine, based on the target information, an indicator indicating high validity as a starting frame for each frame, the starting frame starting predetermined image processing on a target, the starting frame represents a frame to start predetermined image processing on a target as an indicator of the frame in which the target information includes the information indicating that the target exists; or
calculate the indicator based on at least one of (i) information on whether or not a target exists, (ii) an evaluation value indicating a size of an overlapping region of a target and an object other than the target, (iii) an evaluation value representing how a target is close to a predetermined shape, and (iv) an evaluation value representing a magnitude of variation of a pattern in a target, that are included in target information or calculated from target information, wherein the evaluation value representing the magnitude of variation of the pattern in the target is an indicator representing proximity between an image of the target in each frame and a predetermined template image, or a sum of magnitudes of differences in images of the target in consecutive frames;
determine a starting frame based on the indicator; and
interpolate, when a frame in which positional information of a target is not included in target information exists among frames within a predetermined number from the determined starting frame, positional information of the target of the frame that does not include the positional information of the target by using positional information of the target included in target information of a frame other than the frame that does not include the positional information of the target.

2. The information interpolation device according to claim 1, wherein
the processing circuitry is configured to determine the indicator only for a frame necessary for processing of the starting frame determination unit, and
the processing circuitry is configured to acquire target information only for a frame necessary for processing of the processing circuitry.

3. An information interpolation method comprising:
acquiring target information that is information related to a target in an image of each frame composing an input video;
performing either one of:
when a frame next to a frame in which target information includes information indicating that a target does not exist is a frame in which target information includes information indicating that the target exists, determining, based on the target information, an indicator indicating high validity as a starting frame for each frame, the starting frame starting predetermined image processing on a target, the starting frame represents a frame to start predetermined image processing on a target as an indicator of the frame in which the target information includes the information indicating that the target exists; or
calculate the indicator based on at least one of (i) information on whether or not a target exists, (ii) an evaluation value indicating a size of an overlapping region of a target and an object other than the target, (iii) an evaluation value representing how a target is close to a predetermined shape, and (iv) an evaluation value representing a magnitude of variation of a pattern in a target, that are included in target information or calculated from target information, wherein the evaluation value representing the magnitude of variation of the pattern in the target is an indicator representing proximity between an image of the target in each frame and a predetermined template image, or a sum of magnitudes of differences in images of the target in consecutive frames;
determining a starting frame based on the indicator; and
interpolating, when a frame in which positional information of a target is not included in target information exists among frames within a predetermined number from the determined starting frame, positional information of the target of the frame that does not include the positional information of the target by using positional information of the target included in target information of a frame other than the frame that does not include the positional information of the target.

4. A non-transitory computer readable medium that stores a program causing a computer to perform each step of the information interpolation method according to claim 3.

5. An information interpolation device comprising:
processing circuitry configured to:
acquire target information that is information related to a target in an image of each frame composing an input video;
calculate an indicator based on at least one of (i) information on whether or not a target exists, (ii) an evaluation value indicating a size of an overlapping region of a target and an object other than the target, (iii) an evaluation value representing how a target is close to a predetermined shape, and (iv) an evaluation value representing a magnitude of variation of a pattern in a target, that are included in target information or calculated from target information, wherein the evaluation value representing the magnitude of variation of the pattern in the target is an indicator representing proximity between an image of the target in each frame and a predetermined template image, or a sum of magnitudes of differences in images of the target in consecutive frames;
determine a starting frame based on the calculated indicator; and
interpolate, when a frame in which positional information of a target is not included in target information exists among frames within a predetermined number from the determined starting frame, positional information of the target of the frame that does not include the positional information of the target by using positional information of the target included in target information of a frame other than the frame that does not include the positional information of the target.

* * * * *